United States Patent
Deshmukh et al.

(10) Patent No.: US 11,954,894 B2
(45) Date of Patent: Apr. 9, 2024

(54) SYSTEMS AND METHODS FOR DETERMINING CAMERA BLOCKAGE

(71) Applicant: Rivian IP Holdings, LLC, Plymouth, MI (US)

(72) Inventors: Utkarsh Deshmukh, Redwood City, CA (US); Vikram Appia, San Jose, CA (US); Vishwas Venkatachalapathy, San Jose, CA (US); Martin Mueller, San Jose, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 264 days.

(21) Appl. No.: 17/225,518

(22) Filed: Apr. 8, 2021

(65) Prior Publication Data

US 2022/0327323 A1    Oct. 13, 2022

(51) Int. Cl.
| | |
|---|---|
| *G06V 10/40* | (2022.01) |
| *B60S 1/56* | (2006.01) |
| *G06T 5/70* | (2024.01) |
| *G06T 7/11* | (2017.01) |
| *G06T 7/70* | (2017.01) |
| *H04N 17/00* | (2006.01) |

(52) U.S. Cl.
CPC ............ *G06V 10/40* (2022.01); *G06T 5/70* (2024.01); *G06T 7/11* (2017.01); *G06T 7/70* (2017.01); *H04N 17/002* (2013.01); *B60S 1/56* (2013.01)

(58) Field of Classification Search
CPC ......... B60S 1/56; G05D 1/0246; G06T 5/002; G06T 7/11; G06T 7/174; G06T 7/246; G06T 7/70; G06T 2207/10016; G06T 2207/30168; G06T 7/0002; G06V 10/40; G06V 20/56; G06V 10/764; G06V 10/993; G06V 2201/06; G06V 20/46; G06V 10/44; G06F 18/24
USPC ........................................................ 382/104
See application file for complete search history.

(56) References Cited

U.S. PATENT DOCUMENTS

| | | |
|---|---|---|
| 9,582,860 B2 * | 2/2017 | St. Clair ............... G06F 18/214 |
| 10,829,091 B2 | 11/2020 | Herman et al. |
| 11,142,124 B2 * | 10/2021 | Mandai ..................... G06T 7/12 |

(Continued)

FOREIGN PATENT DOCUMENTS

| | | | | |
|---|---|---|---|---|
| CN | 112261403 A | * | 1/2021 | ............ G06T 5/002 |
| EP | 3591956 A1 | * | 1/2020 | |

*Primary Examiner* — Ross Varndell
*Assistant Examiner* — Emmanuel Silva-Avina
(74) *Attorney, Agent, or Firm* — Haley Guiliano LLP

(57) ABSTRACT

A system for determining blockage of a vehicle camera is configured to apply a partition grid having a plurality of locations to a sequence of images to form a plurality of regions. The system determines at least one spatial feature corresponding to the partition grid and at least one temporal feature corresponding to the partition grid. The system generates a sequence of classifications for each location of the plurality of locations based on the at least one spatial feature, the at least one temporal feature, and reference information. The system applies a smoothing technique to determine a subset of regions that are blocked among the sequence of classifications, and generates an output signal based on the subset of regions. The output may be provided to an output system to wash the camera lens, notify the user or the vehicle of the blockage, or modify image processing.

20 Claims, 12 Drawing Sheets

(56) References Cited

U.S. PATENT DOCUMENTS

| | | | |
|---|---|---|---|
| 2019/0258251 A1 | 8/2019 | Ditty et al. | |
| 2020/0380269 A1* | 12/2020 | Mu | G05D 1/0088 |
| 2021/0076454 A1* | 3/2021 | Palanivel | H04W 76/50 |
| 2023/0012645 A1* | 1/2023 | Seo | G06V 10/82 |

* cited by examiner

SYSTEMS AND METHODS FOR DETERMINING CAMERA BLOCKAGE

INTRODUCTION

The present disclosure is directed towards systems and methods for determining camera blockage and, more particularly, for determining camera blockage using a blockage classifier based on features of images.

SUMMARY

In some embodiments, the present disclosure is directed to a method for determining blockage of a camera. The method includes spatially dividing a set of images, for example, by applying a partition grid having a plurality of locations, to form a plurality of regions of each image. In some embodiments, each image of a sequence of images indexed in time is divided. The method includes determining at least one spatial feature corresponding to the partition grid and at least one temporal feature corresponding to the partition grid. The method includes generating a sequence of classifications for each location of the plurality of locations based on the at least one spatial feature, the at least one temporal feature, and reference information. In some embodiments, the reference information includes a threshold, limit, set of instructions, or other reference information for classifying each region of the images. The method includes applying a smoothing technique to determine a subset of regions that are blocked among the sequence of classifications. For example, in some embodiments, the regions that are determined to be blocked are, in aggregate, a blockage mask corresponding to the region of the camera that is effectively blocked. The method includes generating an output signal based on the subset of regions.

In some embodiments, the at least one spatial feature includes a scale feature. The method includes, at each location of each image, determining a sequence of scale sizes, determining a range metric at each location for each scale size of the sequence of scale sizes to generate a set of range metrics, and determining a difference among the set of range metrics. For example, in some embodiments, the method includes determining an array of scale features corresponding to the array of regions (e.g., designated by the partition grid).

In some embodiments, the at least one temporal feature includes a mean feature. The method includes determining, for each image, a respective mean metric at each location corresponding to more than one region to generate a sequence of mean metrics, and determining a difference among the sequence of mean metrics. For example, in some embodiments, the method includes determining an array of mean features corresponding to the array of regions (e.g., designated by the partition grid).

In some embodiments, the at least one temporal feature includes a difference feature. The method includes determining a mean value for each region of a first image to generate a first set of mean values, determining a mean value for each region of a second image to generate a second set of mean values, and determining a difference between each mean value of the first set of mean values with a corresponding mean value of the second set of mean values. The second image is temporally adjacent to the first image. For example, in some embodiments, the method includes determining an array of difference features corresponding to the array of regions (e.g., designated by the partition grid).

In some embodiments, the at least one temporal feature includes a range feature. The method includes determining a mean value for each region of each image of the sequence of images to generate a sequence of mean values for each location of the partition grid, and determining a difference between a maximum value and a minimum value of the sequence of mean values for each location of the partition grid. For example, in some embodiments, the method includes determining an array of range features corresponding to the array of regions (e.g., designated by the partition grid).

In some embodiments, the at least one temporal feature includes a gradient feature. The method includes determining a gradient value for each region of each image of the sequence of images to generate a sequence of gradient values for each location of the partition grid, and determining a difference among gradient values of the respective sequence of gradient values for each respective sequence of gradient values. For example, in some embodiments, the method includes determining an array of gradient features corresponding to the array of regions (e.g., designated by the partition grid).

In some embodiments, determining the at least one spatial feature and the at least one temporal feature includes determining a range feature, a gradient feature, a difference feature, a scale feature, and a mean feature.

In some embodiments, the reference information includes a reference value, and generating the output signal includes determining a blockage extent, determining if the blockage extent exceeds the reference value, and identifying a response if the blockage exceeds the reference value, wherein the output signal is indicative of the response. For example, in some embodiments, the number of regions, or the fraction of regions, of regions that are classified as blocked are compared to a threshold to determine a blockage extent. In a further example, in some embodiments, the number of regions, or the fraction of regions, of regions that are classified as blocked is equivalent to the blockage extent.

In some embodiments, the output signal is configured to cause an image processing module to disregard output of the camera. In some embodiments, generating the output signal includes generating a notification on a display device indicative of a blockage extent. In some embodiments, the output signal is configured to cause a washing system to apply liquid to a face of the camera.

In some embodiments, applying the smoothing technique to determine the subset of regions includes determining a smoothing metric based on a current classification of each location of the plurality of locations, determining a sequence of smoothed classification values based on the smoothing metric and the sequence of classifications, and determining a new classification based on the sequence of smoothed classification values.

In some embodiments, the present disclosure is directed to a system for determining blockage of a camera. The system includes a camera system, control circuitry, and an output interface. The camera system is configured for capturing a sequence of images. The control circuitry is coupled to the camera system and is configured to apply a partition grid comprising a plurality of locations to each image of the sequence of images to form a plurality of regions of each image, wherein each image of the sequence of images is indexed in time. The control circuitry is also configured to determine at least one spatial feature corresponding to the partition grid and at least one temporal feature corresponding to the partition grid; generate a sequence of classifications for each location of the plurality of locations based on the at least one spatial feature, the at least one temporal feature, and reference information; and apply a smooth technique to determine a subset of regions that are blocked among the sequence of classifications. The output interface is configured to generate an output signal based on the subset of regions.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

Camera Blockage can occur due to various reasons such as, for example, dirt accumulation over the camera lens, bird droppings, or placement of an object on the camera. The blockage may degrade the quality of the images, rendering them unusable for other algorithms or by a vehicle occupant. The systems and methods of the present disclosure are directed to determining which parts of the image frames are blocked and responding to the blockage.

Figure 1:
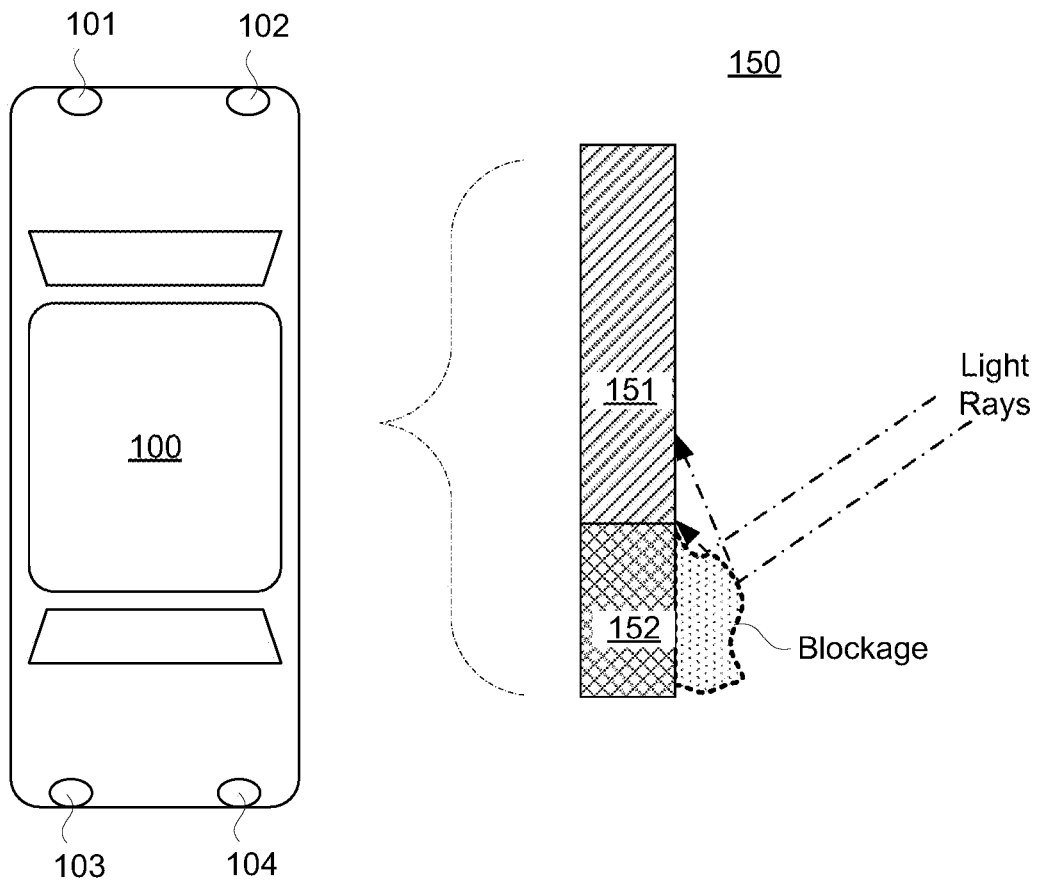
FIG. 1 shows a top view of an illustrative vehicle having several cameras, in accordance with some embodiments of the present disclosure.

FIG. 1 shows a top view of illustrative vehicle 100 having several cameras, in accordance with some embodiments of the present disclosure. As illustrated, vehicle 100 includes cameras 101, 102, 103, and 104, although it will be understood that a vehicle may include any suitable number of cameras in accordance with the present disclosure (e.g., one camera, more than one camera).

Panel 150 illustrates a cross-section view of one camera exhibiting a blockage. The blockage covers portion 152 of the camera, while portion 151 is uncovered (e.g., although portion 151 may be affected by the blockage). The blockage may completely cover portion 152, and may effectively cover at least some of portion 151 (e.g., from an uneven distribution of reflected light from the blockage). The blockage may become lodged on the camera, and may persist for some time (e.g., falling off, dissipating, or remaining). In some embodiments, the systems and methods of the present disclosure are directed to determining which portions of the camera are blocked, as well as responding to the blockage by cleaning the blockage away, disregarding images exhibiting blockage, modifying image processing for output from the camera, generating a notification of the blockage, any other suitable function, or any combination thereof.

Figure 2:
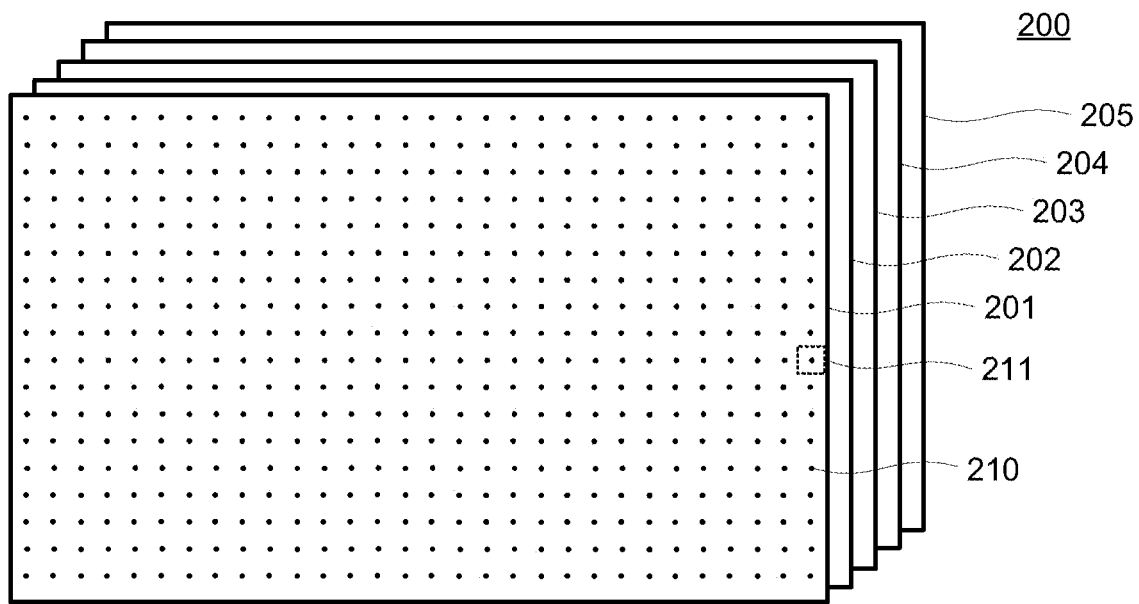
FIG. 2 shows a diagram of an illustrative output from a camera, in accordance with some embodiments of the present disclosure.

FIG. 2 shows a diagram of illustrative output 200 from a camera, in accordance with some embodiments of the present disclosure. As illustrated, output 200 includes a plurality of captures images 201-205, indexed in time (e.g., the images are subsequent). A partition grid, of which point 210 is illustrated, is applied to images 201-205 to define regions. Region 211 corresponds to one location of the partition grid. The partition grid includes N×M points, while region 211 may correspond to a particular number of pixels (e.g., 11×11 pixels, 10×10 pixels, or any other A×B set of pixels) that correspond to each point. For example, images 201-205 may each include (N*A)×(M*B) pixels, grouped into N×M regions each including A×B pixels. In some embodiments, the regions do not overlap. For example, every pixel may be associated with a single region (e.g., along with other pixels). In some embodiments, the regions are at least partially overlap. For example, at least some pixels may be associated with more than one region (e.g., adjacently indexed regions). In some embodiments, the regions do not overlap and are spaced apart. For example, at least some pixels need not be associated with any region (e.g., adjacently indexed regions). Any suitable regions, overlapping or not, or spaced or not spaced, or a combination thereof, may be used in accordance with the present disclosure. The systems and methods of the present disclosure may be applied to determine features of each region for each image, two adjacent images, a set of images, or a combination thereof, and accordingly may include any suitable number of different feature types. For example, one or more features may be extracted for each region of any or each image (e.g., any of images 201-205, for five potential values). In a further example, one or more features may be extracted for each location of the partition grid by comparing two adjacent images (e.g., images 201 and 202, 202 and 203, 203 and 204, or 204 and 205, for four potential values for each location). In a further example, one or more features may be extracted for each location of the partition grid by comparing the set of images 201-205 (e.g., to generate one feature value for each location). In some embodiments, the locations of the partition grid are used to identify a blockage mask corresponding to the set of locations corresponding to a blocked state. In some embodiments, the output of one camera, or more than one camera, may be analyzed to determine feature values. The partition grid need not be rectangular, and may include gaps, spaces, irregularly arranged points, an array, or a combination thereof. The partition grid corresponds to the set of indexes of the feature values, which may but need not correspond to an array. For example, in some embodiments, while a partition grid may be applied to a set of images, the resulting feature values indexed by points of the partition grid need not be directly applicable to a region of a single image. To illustrate, in some embodiments, the partition grid provides a structure for determining feature values rather than a division of a particular image. To illustrate further, the partition grid may include a data structure for storing feature values, indexed by spatial position corresponding to regions of a set of images.

Figure 3:
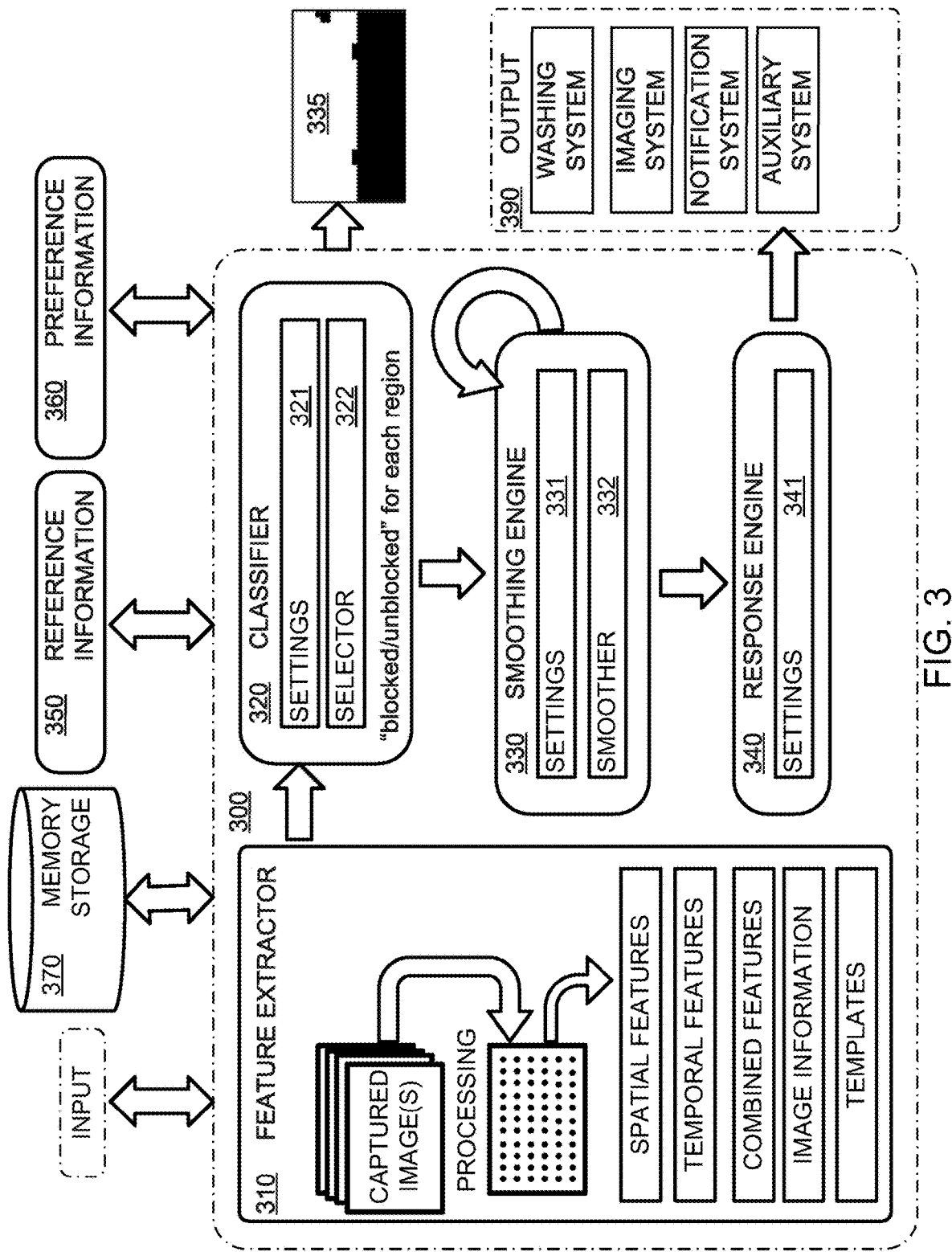
FIG. 3 shows a system diagram of an illustrative system for managing camera blockage and response, in accordance with some embodiments of the present disclosure.

FIG. 3 shows a system diagram of illustrative system 300 for managing camera blockage and response, in accordance with some embodiments of the present disclosure. As illustrated, system 300 includes feature extractor 310, classifier 320, smoothing engine 330, response engine 340, reference information 350, preference information 360, and memory storage 370. It will be understood that the illustrated arrangement of system 300 may be modified in accordance with the present disclosure. For example, components may be combined, separated, increased in functionality, reduced in functionality, modified in functionality, omitted, or otherwise modified in accordance with the present disclosure. System 300 may be implemented as a combination of hardware and software, and may include, for example, control circuitry (e.g., for executing computer readable instructions), memory, a communications interface, a sensor interface, an input interface, a power supply (e.g., a power management system), any other suitable components, or any combination thereof. To illustrate, system 300 is configured to extract features from a set of images, classify the image or regions thereof, evaluate the classification (e.g., smooth the classification), and generate or cause a suitable response to the classification or change in classification.

Feature extractor 310 is configured to determine one or more features of the set of images to determine spatial features, temporal features, spatial-temporal features, image information, any other suitable information, or any combination thereof. Feature extractor 310 may consider a single image (e.g., a set of one), a plurality of images, referencing information, or a combination thereof to determine a feature. For example, images may be captured at 5-10 frames per second, or any other suitable frame rate. In a further example, a group of images may include ten images, less than ten images, or more than ten images for analysis by feature extractor 310. In some embodiments, feature extractor 310 applies pre-processing to each image of the set of images to prepare the image for subdivision and feature extraction. For example, feature extractor 310 may brighten the image or portions thereof, darken the image or portions thereof, color shift the image (e.g., among color schemes, from color to grayscale, or other mapping), crop the image, scale the image, adjusting an aspect ratio of the image, adjust contrast of an image, perform any other suitable processing to prepare image, or any combination thereof. In some embodiments, feature extractor 310 sub samples each image by dividing the image into regions according to a grid (e.g., forming an array of regions that in aggregate constitute the image). To illustrate, referencing the subsampled grid, feature extractor 310 selects a small neighborhood for every center pixel (e.g., N-by-M pixels), resulting in N*M regions (e.g., and N*M values for some features for each image). For example, to illustrate, N and M may be positive integers that may be, but need not be, equal to each other.

In some embodiments, feature extractor 310 determines a spatial feature by considering a single image, and determining a set of feature values for each region of the image (e.g., N*M feature values for each image). Accordingly, feature extractor 310 may store spatial feature values for an image; compare feature values from an image to a reference image or value, and store a comparison metric; scale, normalize, or otherwise modify determined feature values; or a combination thereof. Spatial features include any suitable features determined based on regions of a single image such as, for example, scaled features, gradient features, min/max values, mean values, object recognition, any other suitable feature indicative of spatial variation of an image (e.g., or region thereof), or any combination thereof.

In some embodiments, feature extractor 310 determines a temporal feature by considering multiple images (e.g., a set of consecutive images), and determining a set of feature values for a set of images, or region of the images thereof (e.g., N*M feature values for each image). Accordingly, feature extractor 310 may store temporal feature values for a set or subset of images; compare feature values from a first image to a second, subsequent image (e.g., compare adjacently indexed images), and store a comparison metric; scale, normalize, or otherwise modify determined feature values; or a combination thereof. Temporal features include any suitable features determined based on comparisons of multiple images such as, for example, dynamic ranges, difference values (e.g., changes in mean, min, max values), any other suitable feature indicative of temporal variation among images (e.g., or regions thereof), or any combination thereof.

In some embodiments, feature extractor 310 determines a spatial-temporal feature ("combined features") by considering multiple images (e.g., a set of consecutive images), and determining a set of feature values for regions of the images thereof (e.g., N*M feature values for each of one or more sets of images). Accordingly, feature extractor 310 may store combined feature values for a set or subset of images; compare feature values from a first image to a second, subsequent image (e.g., compare adjacently indexed images) to determine combined features, and store a combined feature value; compare feature values across more than two images (e.g., a change across some index interval of images); or a combination thereof. Combined features include any suitable features determined based on comparisons of regions of each image across multiple images such as, for example, dynamic ranges, difference values (e.g., changes in mean, min, max values), any other suitable feature indicative of spatial and temporal variation among regions of images, or any combination thereof.

Classifier 320 is configured to determine a classification corresponding to the partition grid. For example, each location of the partition grid (e.g., each region) is classified as one state among a selection of states. In some embodiments, the system recognizes two states, blocked and unblocked, and determines whether each region corresponds to the blocked state or the unblocked state. To illustrate, the set of regions in the blocked state forms a blockage mask and may correspond to, for example, the extent of the physical blockage of the camera. In some embodiments, the system recognizes more than two states such as, for example, unblocked, blocked, and impaired. For example, the system may determine an intermediate state (e.g., impaired) between the block and unblocked states. In some embodiments, classifier 320 retrieves or otherwise accesses reference information to determine a classification. For example, classifier 320 may retrieve threshold values, parameter values (e.g., weights), algorithms (e.g., computer-implemented instructions), offset values, or a combination thereof from memory. In some embodiments, classifier 320 applies an algorithm to the output of feature extractor 310 (e.g., feature values) to determine a classification. For example, classifier 320 may apply a least squares determination, weighted least squares determination, support-vector machine (SVM) determination, multilayer perceptron (MLP) determination, any other suitable classification technique, or any combination thereof.

In some embodiments, classifier 320 performs a classification for each frame capture (e.g., each image), and thus updates the classification as each new image is available. In some embodiments, classifier 320 performs the classification based on a set of images and accordingly may determine the classification for each frame (e.g., classify at a frequency equal to the frame rate) or a lesser frequency (e.g., classify every ten frames or other suitable frequency). In some embodiments, classifier 320 performs the classification at a down-sampled frequency such as a predetermined frequency (e.g., in time or number of frames) that is less than the frame rate.

As illustrated, classifier 320 may retrieve or otherwise access settings 321, which may include, for example, classification settings, classification thresholds, predetermined classifications (e.g., two or more classes to which a region may belong), any other suitable settings for classifying regions of an image, or any combination thereof. Classifier 320 may apply one or more settings of settings 321 to classify regions of an image, locations corresponding to a partition grid, or both, based on features extracted by feature extractor 310. As illustrated, classifier 320 includes selector 322, which is configured to select among classifications, classification schemes, classification techniques, or a combination thereof. For example, in some embodiments, selector 322 is configured to select from among a predetermined set of classes based on the output of feature extractor 310. In some embodiments, selector 322 is configured to select from among a predetermined set of classification schemes such blocked/unblocked, blocked/partially-blocked/unblocked, any other suitable scheme, or any combination thereof. In some embodiments, selector 322 is configured to select from among a predetermined set of classification techniques such as, for example, a least squares technique, weighted least squares technique, support-vector machine (SVM) technique, multilayer perceptron (MLP) technique, any other suitable technique, or any combination thereof.

Smoothing engine 330 is configured to smooth output of classifier 320. In some embodiments, smoothing engine 330 takes as input a classification from classifier 320 (e.g., for each region), and determines a smoothed classification that may, but need not, be the same as the output of classifier 320. To illustrate, classifier 320 may identify a blockage, or the removal of a blockage, relatively quickly (e.g., from frame-to-frame, or over the course of several frames). Smoothing engine 330 smooths this transition to ensure some confidence in a change of state. For example, smoothing engine 330 may increase latency in state changes (e.g., blocked-unblocked), reduce frequency state changes (e.g., prevent short time-scale fluctuations in state), increase confidence in a transition, or a combination thereof. In some embodiments, smoothing engine 330 applies the same smoothing for each transition direction. For example, smoothing engine 330 may implement the same algorithm and same parameters thereof regardless of the direction of the state change (e.g., blocked to unblocked, or unblocked to blocked). In some embodiments, smoothing engine 330 applies a different smoothing for each transition direction. For example, smoothing engine 330 may determine the smoothing technique, or parameters thereof, based on the current state (e.g., the current state may be "blocked" or "unblocked"). Smoothing engine 330 may apply a statistical technique, a filter (e.g., a moving average or other discreet filter), any other suitable technique for smoothing output of classifier 320, or any combination thereof. To illustrate, in some embodiments, smoothing engine 330 applies Bayesian smoothing to the classifications of classifier 320. In some embodiments, more smoothing is applied for transitioning from blocked to unblocked than for transitioning from unblocked to blocked. As illustrated, smoothing engine 330 may output blockage mask 335 corresponding to the smoothed classification values for each region. As illustrated, for example, black in blockage mask 335 corresponds to blocked and white in blockage mask 335 corresponds to unblocked (e.g., the bottom of the camera is exhibiting blockage).

Response engine 340 is configured to generate an output signal based on a state transition determined by smoothing engine 330. Response engine 340 may provide the output signal to an auxiliary system, an external system, a vehicle system, any other suitable system, a communications interface thereof, or any combination thereof. In some embodiments, response engine 340 provides an output signal to a cleaning system (e.g., a washing system) to spray water or other liquid on a camera face (e.g., or enable a mechanical clean such as a wiper) to clear a blockage. In some embodiments, response engine 340 provides an output signal to, or otherwise includes, a notification system to generate a notification. For example, the notification may be displayed on a display screen such as a touchscreen of a smartphone, a screen of a vehicle console, any other suitable screen, or any combination thereof. In a further example, the notification may be provided as an LED light, console icon, or other suitable visual indicator. In a further example, a screen configured to provide a video feed from the camera feed being classified may provide a visual indicator such as a warning message, highlighted area of the video feed corresponding to blockage, any other suitable indication overlaid on the video or otherwise presented on the screen, or any combination thereof. In some embodiments, response engine 340 provides an output signal to an imaging system of a vehicle. For example, a vehicle may receive images from a plurality of cameras to determine environmental information (e.g., road information, pedestrian information, traffic information, location information, path information, proximity information) and accordingly may alter how images are processed in response to a blockage or unblockage.

In some embodiments, as illustrated, response engine 340 includes one or more settings 341 that may include, for example, notification settings, blockage thresholds, predetermined responses (e.g., the type of output signal to generate in response to blockage mask 335), any other suitable settings for affecting any other suitable process, or any combination thereof.

In an illustrative example, system 300 (e.g., feature extractor 310 thereof) may receive a set of images (e.g., repeatedly at a predetermined rate) from a camera output. Feature extractor 310 applies a partition grid and determines a set of feature values corresponding to the grid, each feature corresponding to one or more images. Feature extractor 310 may determine one or more spatial features, one or more temporal features, one or more combined features (e.g., spatial-temporal features), any other suitable information, or any combination thereof. The extracted features are outputted to classifier 320, which classifies each location of the partition grid accordingly to one or more states (e.g., blocked or unblocked). Smoothing engine 330 receives the classification from classifier 320, along with historical classification information, to generate a smoothed classification. As more images are processed over time (e.g., by feature extractor 310 and classifier 320), smoothing engine 330 manages changing blockage mask 335 (e.g., based on the smoothed classification). Accordingly, the output of smoothing engine 330 is used by response engine 340 to determine a response to a determination that the camera is at least partially blocked or unblocked. Response engine 340 determines a suitable response, based on settings 341, by generating an output signal to one or more auxiliary systems (e.g., a washing system, an imaging system, a notification system).

Figure 4:
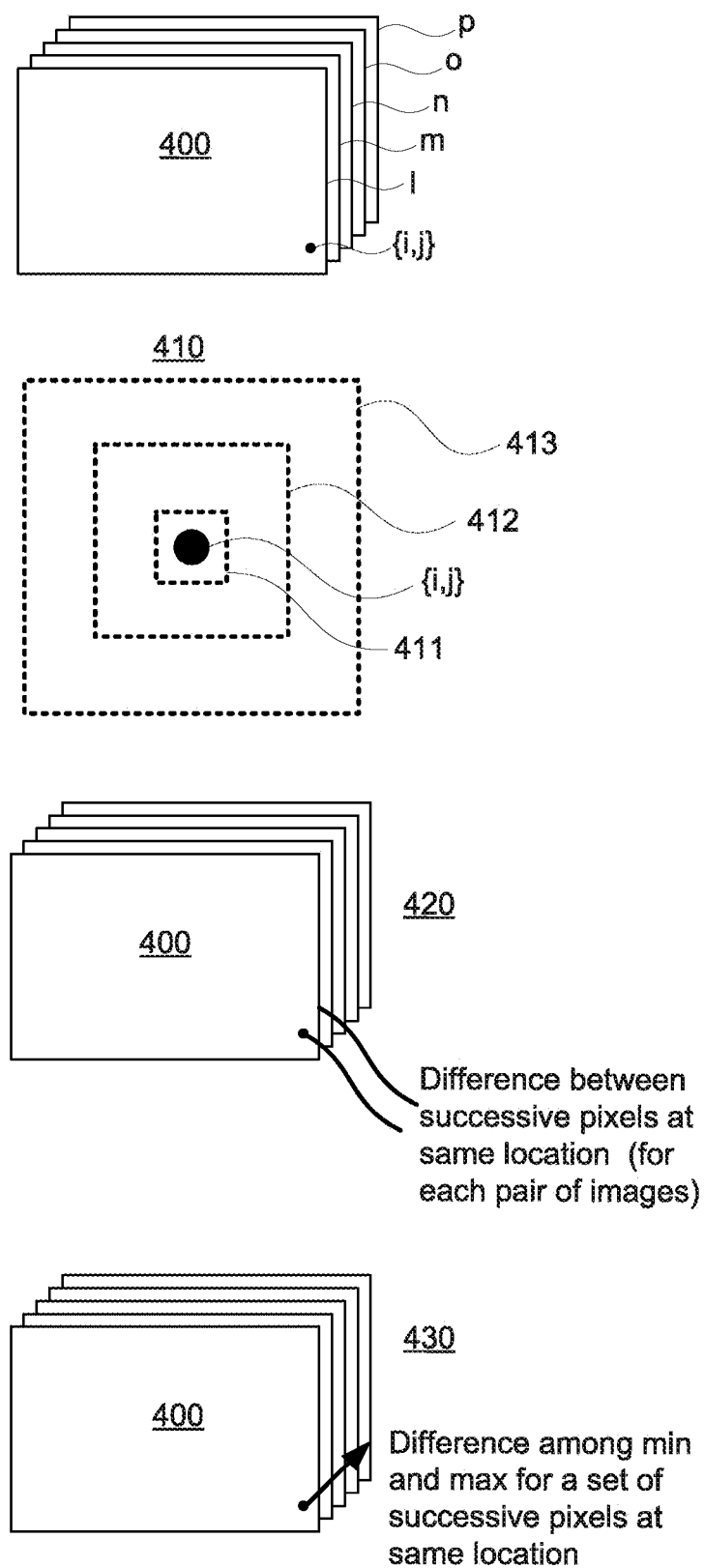
FIG. 4 shows a diagram of an illustrative set of images for extracting features, in accordance with some embodiments of the present disclosure.

FIG. 4 shows a diagram of an illustrative set of images for extracting features, in accordance with some embodiments of the present disclosure. Set of images 400, as illustrated, includes five images denoted by {l, m, n, o, p}. One illustrative point of the partition grid is illustrated, denoted by {i, j}, wherein the partition grid includes N×M locations (e.g., where i is in the set integers 1:N, and j is in the set of integers 1:M). Set of images 400 spans a time interval (e.g., equal to four times the frame rate as the time elapsed between image 1 and image p). In an illustrative example, the features disclosed in the context of FIG. 4 may be determined by feature extractor 310 of FIG. 3.

Referencing panel 400, the system may determine one or more mean features (MF) corresponding to the partition grid. To illustrate, if the blocking material is clay covering only a part of the image sensor, the unblocked part may experience a degradation that is dependent on where the surrounding light is coming from (e.g., the direction of irradiance). This may occur because the light bounces off the clay surface and brightens the unblocked part on the image sensor. In some circumstances, a sudden change in lighting may cause a classifier (e.g., classifier 320) to give false positives. Accordingly, the system may use a small neighborhood around each location of the partition grid, and compute the mean in each neighborhood. In some embodiments, the system may determine mean values for all the images in a group of images. For example, the mean values should be nearly the same for all of these images because they are captured one after the other in presumed similar lighting. In an illustrate example, the system may determine mean features (e.g., a temporal feature) by determining, for each image, a respective mean metric at each location corresponding to more than one region to generate a sequence of mean metrics. The system then determines a difference among the sequence of mean metrics to generate the mean feature. In some embodiments, the difference includes, for example, a difference between a maximum value and a minimum value of the mean metrics, for each location or a reduced subset of locations. In some embodiments, the difference includes, for example, a variance such as a standard deviation (e.g., relative to an average value of the mean metrics), for each location or a reduced subset of locations.

Referencing panel 420, the system may determine one or more difference features, such as pixel absolute difference (PAD), for example. The system may determine the difference, as a purely temporal feature, by capturing frame-to-frame variation in a scene occurring over a very short time interval (e.g., inverse of the frame rate). For example, in considering two consecutive image frames, the absolute difference between the two frames (e.g., difference in mean values) may capture this variation. In an illustrative example, the system may determine a difference feature by determining a mean value for each region of a first image to generate a first set of mean values, determining a mean value for each region of a second image to generate a second set of mean values (e.g., the second image is temporally adjacent to the first image), and determining a difference between each mean value of the first set of mean values with a corresponding mean value of the second set of mean values (e.g., to generate an array of difference feature values).

Referencing panel 410, the system may determine one or more scale features (SF) corresponding to the partition grid (e.g., as a spatial feature). The system may determine the scale feature to capture variation in space at various length scales (e.g., various sizes of regions, equivalent to various number of pixels). The system may determine scale features by identifying a small neighborhood (e.g., a window) for each region (e.g., any particular pixel or group of pixels), and determine a range (e.g., a maximum value minus a minimum value or any other suitable metric indicative of range) within that neighborhood to capture the variation in the scene at that scale. The system then changes the size of the window, and repeats determining a range at various window sizes. In an illustrative example, the system may determine a scale feature by determining a sequence of scale sizes at each location of each image, determining a range metric at each location for each scale size of the sequence of scale sizes to generate a set of range metrics, and determining a difference among the set of range metrics. For example, the system may determine a range for the set of range metrics such as a difference between a maximum value and a minimum value among the set of range metrics. In a further example, the system may identify one or more scales (e.g., the feature value corresponds to a scale size).

Panel 430 illustrates a technique for determining a dynamic range feature. For example, the dynamic range feature may include a pixel dynamic range (PDR), which is a temporal feature. The dynamic range feature capture activity occurring at a location with respect to time. In some embodiments, the activity is captured by determining a minimum value and a maximum value among set of images 400 at each location {i, j}. To illustrate, for each set of images (e.g., set of images 400), a single maximum value and a single minimum value are determined for each location. In some embodiments, the dynamic range is determined as the difference between the maximum value and the minimum value, and is indicative of the amount of variation occurring for that region over the time interval (e.g., corresponding to set of images 400). To illustrate, if the region is blocked, the difference in max-min would not be relatively large. To illustrate further, the dynamic range feature may also help identify whether the region is blocked or not, especially during nighttime when most of the image content is black. In some embodiments, the system may select all the pixels in a region, or may subsample pixels of the region. For example, in some circumstances, selecting fewer pixels still allows sufficient performance to be retained. In an illustrative example, the system may determine a mean value for each region of each image of a sequence of images to generate a sequence of mean values for each location of a partition grid. The system then determines a difference between a maximum value and a minimum value of the sequence of mean values for each location of the partition grid (e.g., or may subsample the partition grid for lesser or greater number of values and resolution).

Referencing panel 430, the system may determine one or more gradient features, also referred to as a gradient dynamic range (GDR). While the system, in determining a PDR metric, captures temporal variation, GDR allows some spatial information to be taken into account. In order to capture the spatial variation, the system determines an image gradient (e.g., or other suitable difference operator) using any suitable technique such as, for example, a Sobel operator (e.g., 3×3 matrix operators), a Prewitt operator (e.g., 3×3 matrix operators), a Laplacian operator (e.g., gradient divergence), a gradient of Gaussians technique, any other suitable technique, or any combination thereof. The system determines a range of gradient values at each region (e.g., at any pixel location, or group of pixels) over time (e.g., for a set of images) to determine the change in the gradient metric. Accordingly, the gradient feature is a spatial-temporal feature. To illustrate, the gradient or spatial difference determination captures the spatial variation whereas the dynamic range component captures the temporal variation. In an illustrative example, the system may determine the gradient feature by determining a gradient value for each region of each image of the sequence of images to generate a sequence of gradient values for each location of the partition grid, and determining (for each respective sequence of gradient values) a difference among gradient values of the respective sequence of gradient values.

In some embodiments, the computation of a maximum value and minimum value are relatively cheap computationally, and thus may be used to determine ranges (e.g., over time). For example, other values may be used such as average values, standard deviations, variances, or other values, but may incur additional computational requirements as compared to determining the minimum and maximum values (e.g., and differences thereof). For example, the use of minimum and maximum values may perform sufficiently (e.g., as compared to other approaches requiring more computation).

Figure 5:
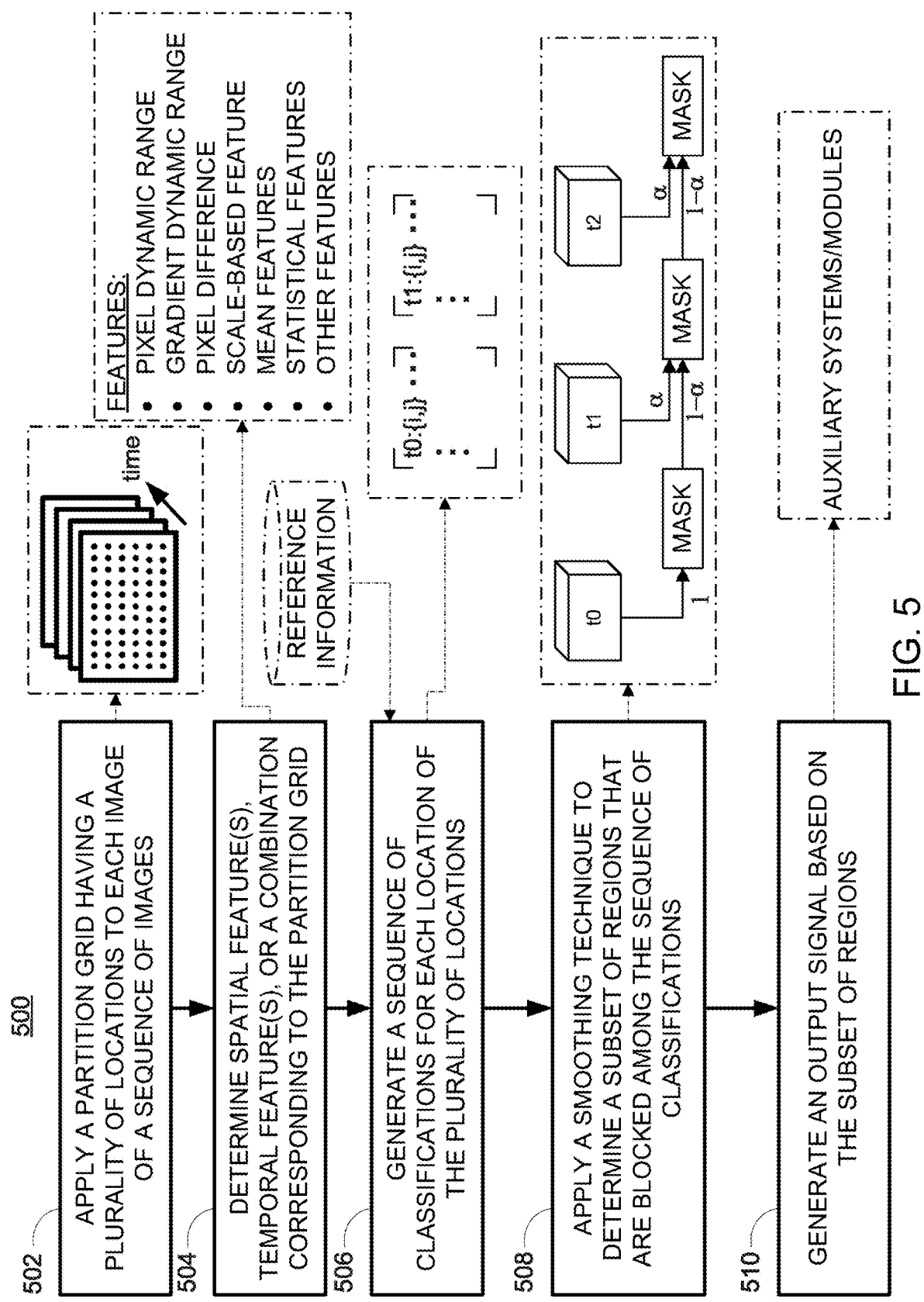
FIG. 5 shows a flowchart of an illustrative process for managing camera blockage and response, in accordance with some embodiments of the present disclosure.

FIG. 5 shows a flowchart of illustrative process 500 for managing camera blockage and response, in accordance with some embodiments of the present disclosure. In some embodiments, the process 500 is implemented by a system such as, for example, any of the illustrative systems and techniques of FIGS. 3-4. In some embodiments, process 500 is an application implemented on any suitable hardware and software that may be integrated into a vehicle, communicate with systems of a vehicle, include a mobile device (e.g., a smartphone application), or a combination thereof.

At step 502, the system applies a partition grid to each image (e.g., of a sequence of images). The partition grid includes a set of indexes, which may correspond to a plurality of locations forming a plurality of regions of each image. The partition grid may include an array, a set of indices, a mask, or a combination thereof that may be regular (e.g., a rectangular array), an irregularly arranged set of indices, a set of indices corresponding to irregularly sized regions (e.g., fewer regions at the periphery), overlapping regions, spaced regions, or a combination thereof. For example, the partition grid defines locations that subdivide each image into regions such that each region may be analyzed. In a further example, the partition grid may include N×M locations, wherein N and M are positive integers greater than one, resulting in an array of regions. In a further example, in some embodiments, applying a partition grid includes retrieving or accessing pixel data for a region of one or more images for use in step 504. In some embodiments, each image of the sequence of images is indexed in time. For example, the images may include frames of a video feed captured by a camera and stored as individual images indexed in the order captured (e.g., at a suitable frame rate). In an illustrative example, the system may apply a partition grid to each image to result in an array of regions of each image (e.g., the product of N*M), and thus for K frames. In a further illustrative example, for K frames and a particular feature (e.g., of one or more features), the system may determine K*N*M values corresponding to the regions of each image (e.g., for each feature type, wherein there may be more than one feature type). In some embodiments, each region corresponds to a pixel, a set of pixels (e.g., A×B pixels in each region), or a combination thereof. In some embodiments, the partition grid includes an indexing array used to index regions of an image or set of images.

At step 504, the system determines at least one spatial feature, at least one temporal feature, or a combination thereof corresponding to the partition grid. To illustrate, step 504 may be performed by feature extractor 310 of FIG. 3, and may include any of the illustrative features described in the context of FIG. 4, for example. The features may include, for example, a range feature, a gradient feature, a difference feature, a scale feature, a mean feature, a statistical feature (e.g., an average, a standard deviation, a variance), any other suitable feature, or any combination thereof. To illustrate, the features may include one or more mean features (MF), one or more difference features, one or more scale features, one or more dynamic range features, one or more gradient features, a maximum value, minimum value, any other suitable feature, or any combination thereof.

At step 506, the system generates a sequence of classifications for each location of the plurality of locations based on the features of step 504. In some embodiments, for example, the sequence of classifications for each location is based on at least one spatial feature, at least one temporal feature, at least one combined feature, reference information, or a combination thereof. In some embodiments, the system trains a classifier to predict whether a given feature descriptor belongs to the "blocked" or "unblocked" class. In some embodiments, the system implements a trained classifier to take as input feature values, and return a classification for each region (e.g., corresponding to the partition grid). To illustrate, the output of the classifier may include an array that corresponds to the partition grid, with each position in the array including one of two values (e.g., a binary system of blocked or unblocked). In some embodiments, the system may generate a new set of classification values corresponding to the partition grid at the same rate as the frame rate, or a slower rate than the frame rate (e.g., for every K images such as ten images or any other suitable integer). In some embodiments, the system generates a new set of classification values corresponding to the partition grid at a predetermined frequency, in response to an event (e.g., a trigger from an algorithm or controller), or a combination thereof.

At step 508, the system applies a smoothing technique to determine a subset of regions that are blocked among the sequence of classifications. In some embodiments, for example, the system implements a Bayesian smoothing technique to smooth the classifications. Because the classification of step 506 is discrete (e.g., a binary classifier outputting either blocked or unblocked for each region), the classification may exhibit fluctuations (e.g., when the classifier generates a false positive). The system smooths the output of step 506 to address such fluctuations and build confidence in any changes of state that may occur. In some embodiments, the system monitors historical classifications (e.g., previous classifications for each region) as well as the current classification output of step 506. In some such embodiments, the system weights the historical values and the current value to determine a smoothed output (e.g., which may be a state among the same state categories as step 506). For example, if the system determines a class among the classes blocked and unblocked for each region at step 506, the system determines a smoothed class value from among the classes blocked or unblocked at step 508. The system smooths the classifier output to build confidence about class predictions before outputting a signal indicative of a state change.

Figure 6:
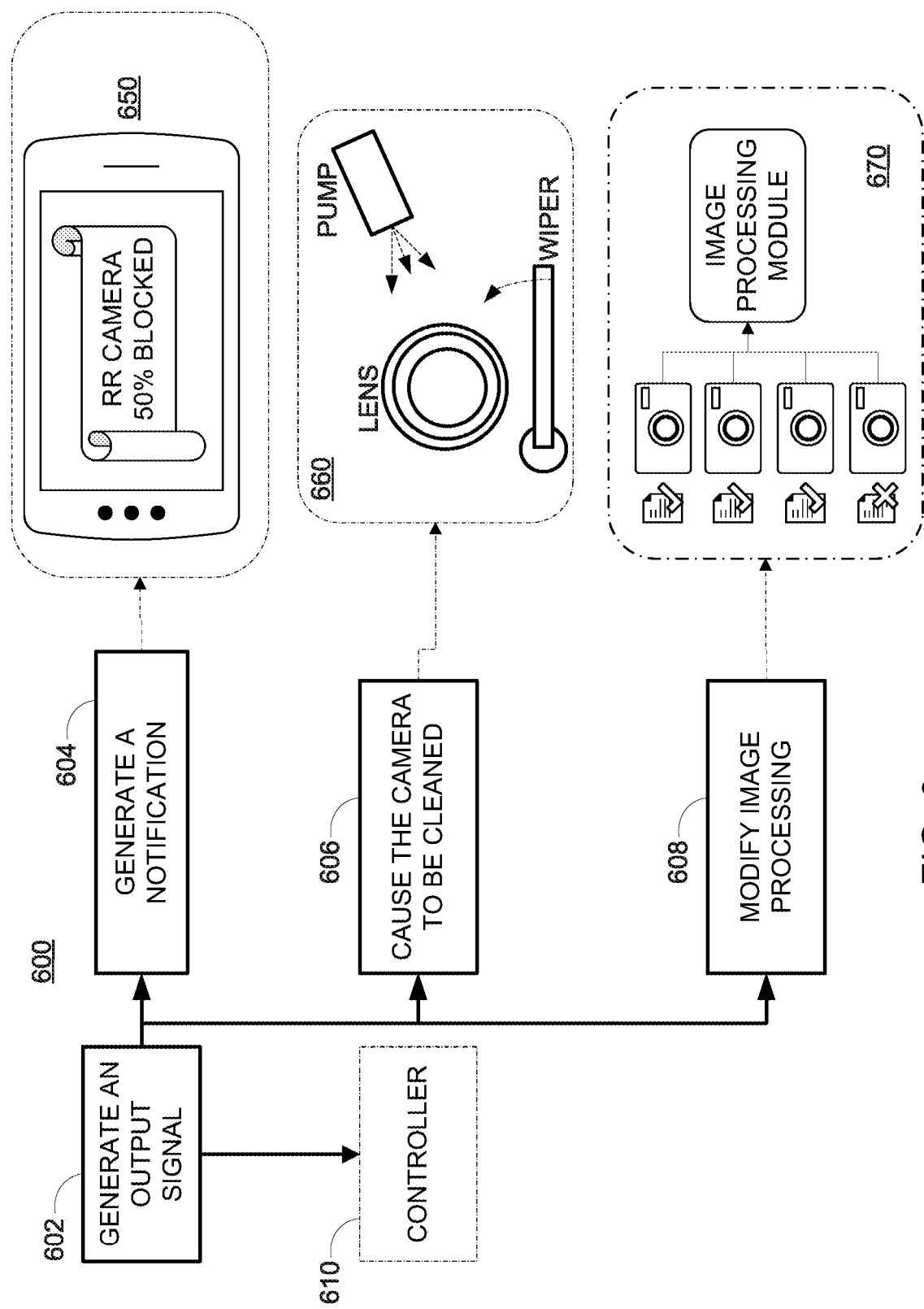
FIG. 6 shows a flowchart of an illustrative process managing a classification, in accordance with some embodiments of the present disclosure.

At step 510, the system generates an output signal based on the subset of regions. For example, the system may determine a state change from unblocked to blocked at step 508, and accordingly may generate the output signal. In some embodiments, the system identifies all regions having the state blocked, and collectively identifies the set of such regions as a blockage mask, which corresponds to the blockage (e.g., the blocked regions of the camera). The illustrative steps of process 600 of FIG. 6 provide examples of output based on the smoothed classification. The system may generate the output signal based on a state transition determined at step 508. The system may provide the output signal to, for example, an auxiliary system, an external system, a vehicle system, any other suitable system, a communications interface thereof, or any combination thereof. In some embodiments, the system provides an output signal to a cleaning system (e.g., a washing system) to spray water or other liquid on a camera face (e.g., or enable a mechanical clean such as a wiper) to clear a blockage. In some embodiments, the system provides an output signal to, or otherwise includes, a notification system to generate a notification. For example, the notification may be displayed on a display screen such as a touchscreen of a smartphone, a screen of a vehicle console, any other suitable screen, or any combination thereof. In a further example, the notification may be provided as an LED light, console icon, or other suitable visual indicator. In a further example, a screen configured to provide a video feed from the camera feed being classified may provide a visual indicator such as a warning message, highlighted area of the video feed corresponding to blockage, any other suitable indication overlaid on the video or otherwise presented on the screen, or any combination thereof. In some embodiments, the system provides an output signal to an imaging system of a vehicle. For example, a vehicle may receive images from a plurality of cameras to determine environmental information (e.g., road information, pedestrian information, traffic information, location information, path information, proximity information) and accordingly may alter how images are processed in response to a blockage or unblockage.

In an illustrative example, the system may implement process 500 as a feature extractor, classifier, and smoother. The feature extractor may determine a variety of features (e.g., one or more features, such as five different feature descriptors extracted from a group of images). To illustrate, the feature extractor creates a feature descriptor for a point corresponding to a region of the image. A feature descriptor (the feature) may include a set of values (e.g., an array of numbers) which "describe" the region undergoing classification. The classifier takes as input the extracted features and determines a label prediction for each region. The smoother (e.g., a Bayesian smoother) smooths the classifier prediction over time to mitigate the false positives arising from the classifier to increase confidence in a change of state (e.g., to improve detection performance).

In a further illustrative example, process 500 may be dependent at least in part on the movement of the car to make a prediction about a pixel being blocked or unblocked. In some embodiments, some temporal scene variation improves performance of the classification. For example, if the car is at a standstill, the feature descriptors may start producing faulty values or otherwise values that are difficult to characterize (e.g., the dynamic values will all be nearly 0 since there is no variation in the scene). In some embodiments, to address low scene variability, the system may integrate the vehicle state estimator to determine whether the vehicle is sufficiently in motion or not.

FIG. 6 shows a flowchart of an illustrative process 600 for managing a classification, in accordance with some embodiments of the present disclosure. In some embodiments, process 600 or aspects thereof may be combined with any of the illustrative steps of process 500.

At step 602, the system generates an output signal. For example, step 602 may the same as step 510 of process 500 of FIG. 5. The system may generate and provide the output signal to, for example, an auxiliary system, an external system, a vehicle system, a controller, any other suitable system, a communications interface thereof, or any combination thereof.

At step 604, the system generates a notification. In some embodiments, the system provides an output signal to a display system to generate a notification. For example, the notification may be displayed on a display screen such as a touchscreen of a smartphone, a screen of a vehicle console, any other suitable screen, or any combination thereof. In a further example, the notification may be provided as an LED light, console icon, a visual indicator such as a warning message, a highlighted area of the video feed corresponding to blockage, a message (e.g., a text message, an email message, an on-screen message), any other suitable visual or audible indication, or any combination thereof. To illustrate, panel 650 shows a message overlaid on a display of a touchscreen (e.g., of a smartphone or vehicle console), indicating that the right-rear (RR) camera is 50% blocked. To illustrate further, the notification may provide an indication to the user (e.g., a driver or vehicle occupant) to clean the camera, disregard images from the camera, or otherwise factor the blockage into considering images from the camera.

At step 606, the system causes the camera to be cleaned. In some embodiments, the system provides an output signal to a cleaning system (e.g., a washing system) to spray water or other liquid on a camera face (e.g., or enable a mechanical clean such as a wiper) to clear a blockage. In some embodiments, the output signal causes a wiper motor to reciprocate a wiper across the camera lens. In some embodiments, the output signal causes a liquid pump to activate and pump a cleaning fluid towards the lens (e.g., as a spray from nozzle coupled by a tube to the pump). In some embodiments, the output signal is received by a cleaning controller, which controls operation of a cleaning fluid pump, a wiper, or a combination thereof. To illustrate, panel 660 illustrates a pump and a wiper configured to clean a camera lens. The pump sprays cleaning fluid towards the lends to dislodge or otherwise dissolve/soften the blockage, while the wiper rotates across the lens to mechanically clear the blockage.

At step 608, the system modifies image processing. In some embodiments, the system provides an output signal to an imaging system of a vehicle. For example, a vehicle may receive images from a plurality of cameras to determine environmental information (e.g., road information, pedestrian information, traffic information, location information, path information, proximity information) and accordingly may alter how images are processed in response to a blockage or unblockage. To illustrate, panel 670 illustrates an image processing module that takes as input images from four cameras (e.g., although any suitable number of camera may be include such as one, two, or more than two). As illustrated in panel 670, one of the four cameras exhibits a blockage (e.g., indicated by the "x"), while the other three cameras do not (e.g., indicated by the check marks). The image processing module may, in some embodiments, disregard output from the camera exhibiting blockage, disregard a portion of images from the camera exhibiting blockage, lessen a weight or significance associated with the camera exhibiting blockage, any other suitable modification to considering the entirety of the output of the camera exhibiting blockage, or a combination thereof. The determination whether to modify image processing may be based on the extent of blockage (e.g., the fraction of blocked pixels to total pixels), shape of blockage (e.g., a largely skewed aspect ratio such as a streak blockage might be less likely to trigger modification than a more square aspect ratio), which camera is identified as exhibiting blockage, time of day or night, user preference (e.g., included in reference information as a threshold or other reference), or a combination thereof.

In some embodiments, at step 608, the system disregards a portion of the output of the camera. For example, the system may disregard, or otherwise not include during analysis, the portion of the camera output corresponding to the blockage mask. In a further example, the system may disregard a quadrant, a half, a sector, a window, any other suitable collection of pixels having a predetermined shape, or any combination thereof based on the blockage mask (e.g., the system may map the blockage mask to a predetermined shape and then size and arrange the shape accordingly to indicate the portion of the camera output to disregard).

Figure 7:
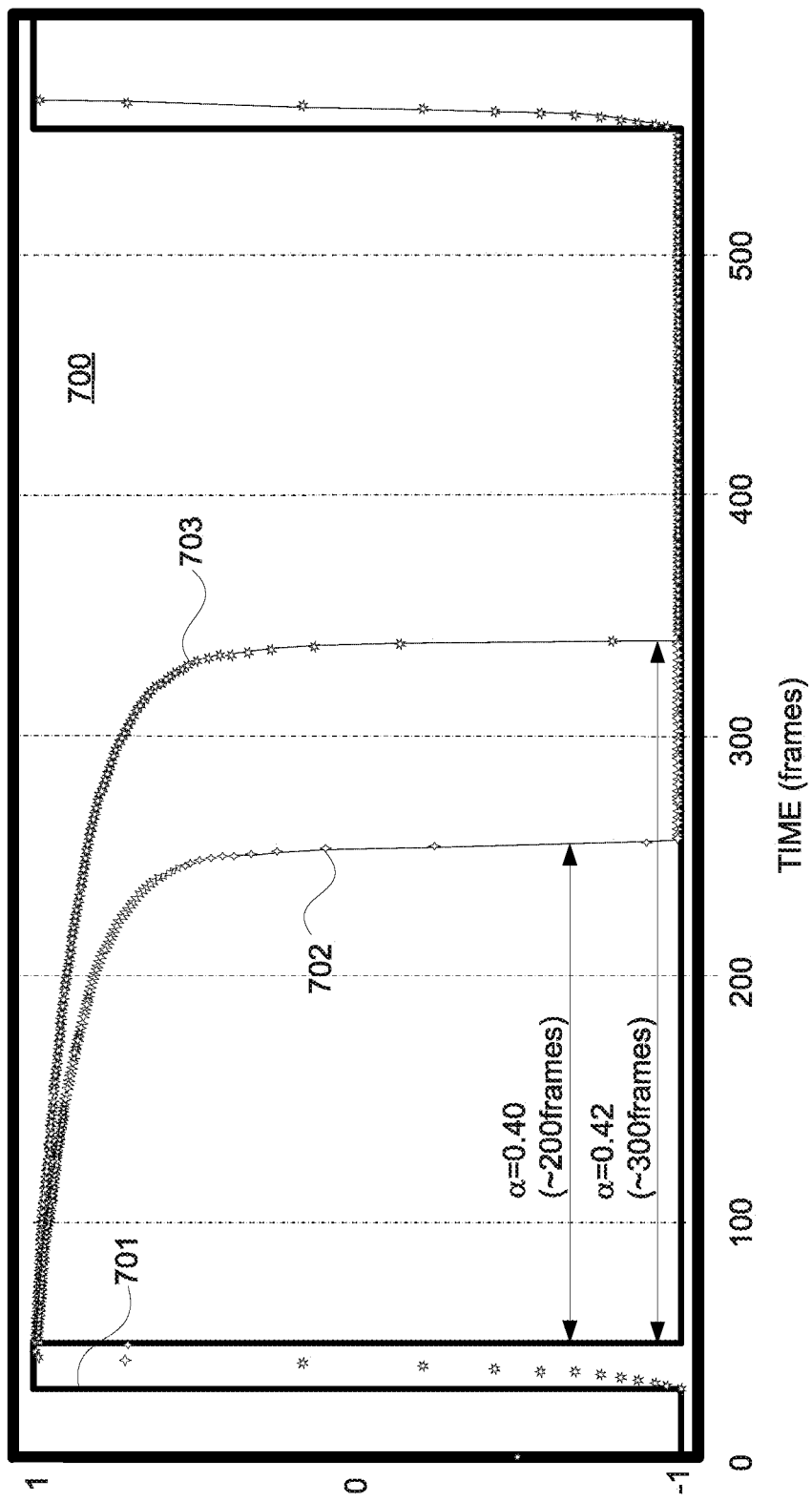
FIG. 7 shows a plot of illustrative responses for a smoothed classifier, in accordance with some embodiments of the present disclosure.
Figure 8:
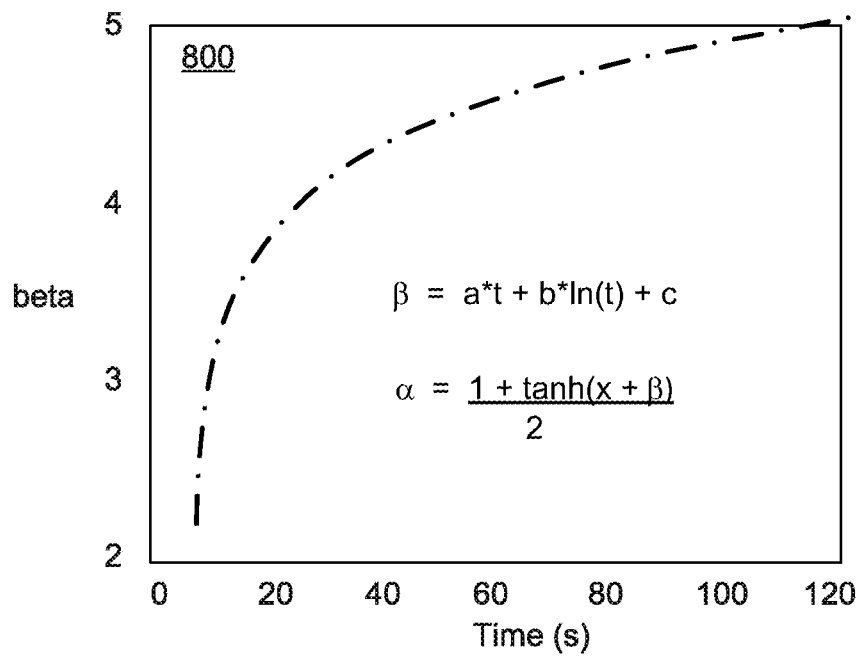
FIG. 8 shows a plot of an illustrative relationship between time and a smoothing metric, in accordance with some embodiments of the present disclosure.
Figure 9:
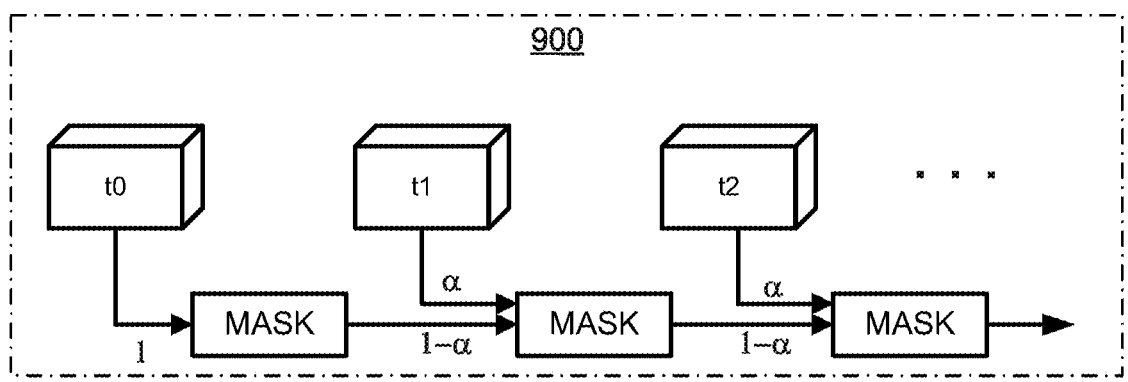
FIG. 9 shows a block diagram of an illustrative smoothing technique, in accordance with some embodiments of the present disclosure.

FIG. 7 shows plot 700 of illustrative responses for a smoothed classifier, in accordance with some embodiments of the present disclosure. FIG. 8 shows plot 800 of an illustrative relationship between time and a smoothing metric, in accordance with some embodiments of the present disclosure. FIG. 9 shows a block diagram of an illustrative smoothing technique, in accordance with some embodiments of the present disclosure. In some embodiments, process 500 of FIG. 5 may include the smoothing metric of FIG. 8 and the technique of FIG. 9, and may be used to generate data of plot 700 (e.g., wherein the abscissa corresponds to time, and the ordinate corresponds to classification). Trace 701 represents classifier output (e.g., from step 506 of process 500). Traces 702 and 703 illustrate smoothed classifications generated using process 500 (e.g., with differing smoothing metrics). When the classifier (e.g., classifier 320 of FIG. 3) changes its state from −1 (e.g., "blocked") to 1 (e.g., "unblocked" or "normal"), due to the Bayesian smoothing, the smoothed classifier (e.g., smoothing engine 330 of FIG. 3) does not change the decision immediately. The smoothed classifier causes the state transition to delay for some time to build confidence on the true state of the region (e.g., the one or more pixels corresponding to the region). If the classifier repeatedly classifies a region as class "A", that slowly reinforces the confidence that the true label of the pixel is class "A". As illustrated in FIG. 7, the smoothing classifier applies an uneven bias in the Bayesian smoothing technique. For example, in order to go from state −1 to state 1, it takes many fewer samples (e.g., frames, or time) as compared to transitioning from state 1 to state −1. This is because the classifier may be configured to account for pixels most probably being unblocked (e.g., state 1 as illustrated). For example, if the classifier predicts the "unblocked" label, is may be desirable to quickly gain confidence, whereas if a region is classified as blocked, is may desirable to wait longer before declaring that that the region is blocked (e.g., transitioning to the "blocked" state). In some embodiments, each region may have an associated parameter value (e.g., alpha value, beta value, or both), which may be, but need not be, the same as other regions. For example, region along the edges, in the middle, at the top, at the bottom, or regions otherwise corresponding to any other part of the camera may associated with different parameters values.

As illustrated in FIGS. 8-9, the parameter controlling the shape of the transition curve is alpha "a" (also referred to as the "momentum"), which affects the time required for a state transition. Parameter alpha may be determined by, for example, using the formula illustrated in FIG. 8. The larger the value of alpha, the longer it will take to make a complete change in decision from a first state to a second state (e.g., blocked to unblocked, or vice versa). In a further example, the parameter alpha may have a different value depending on the state at classification. To illustrate, if the current state is "unblocked," the alpha value may be larger than if the current state is "blocked," to cause the response to take a longer time (e.g., more frames, and more confidence) to transition to the "blocked" state. The trace shown in plot 800 illustrates a parameter beta "β" that is shown as a function of time. The parameter beta may be determined based on empirical data, a model fit, a functional relationship, or a combination thereof. The parameter alpha is determinable from beta using, for example, the equation shown in plot 800, or any other suitable relationship (e.g., another function, a lookup table, or an algorithm). The coefficients a, b, and c may be stored in reference information, may depend on the current state (e.g., blocked or unblocked), and may include any suitable value. In an illustrative example, the coefficients a, b, and c, may have values −0.0028, 0.6962, and 1.9615, respectively. For example, referencing plot 800 in FIG. 8, if an elapsed time for state transition of 60 seconds (e.g., before changing a prediction label) is desired, the smoothing classifier may use a beta value of 4.6.

As illustrated in FIG. 9, the parameter alpha is used to affect the "momentum" of the current state and thus affect the transition to another state. A sequence of block masks are illustrated, updated at each time step t0, t1, t2, etc. using the parameter alpha. Accordingly, the value of the classification for any region of a particular mask may be a value that corresponds to either state or an intermediate value while the state transitions. As the blockage mask is updated, the smoothed classification approaches the classification, and may eventually reach the classification value in a time interval (e.g., dependent upon the value of parameter beta). False triggers or other fluctuations in classification are thus prevented from causing excessive state transitions by use of the smoothing classifier. In some embodiments, the parameter beta is based on a time of day (e.g., a proxy for brightness). For example, the smoothing classifier may need less time to build confidence in a prediction label during the daytime than at nighttime, when the image may be less bright or exhibit less contrast. The reinforcement of the classifier output occurs over time, in a non-linear manner for example, to increase the confidence and reduce false positives.

Figure 10:
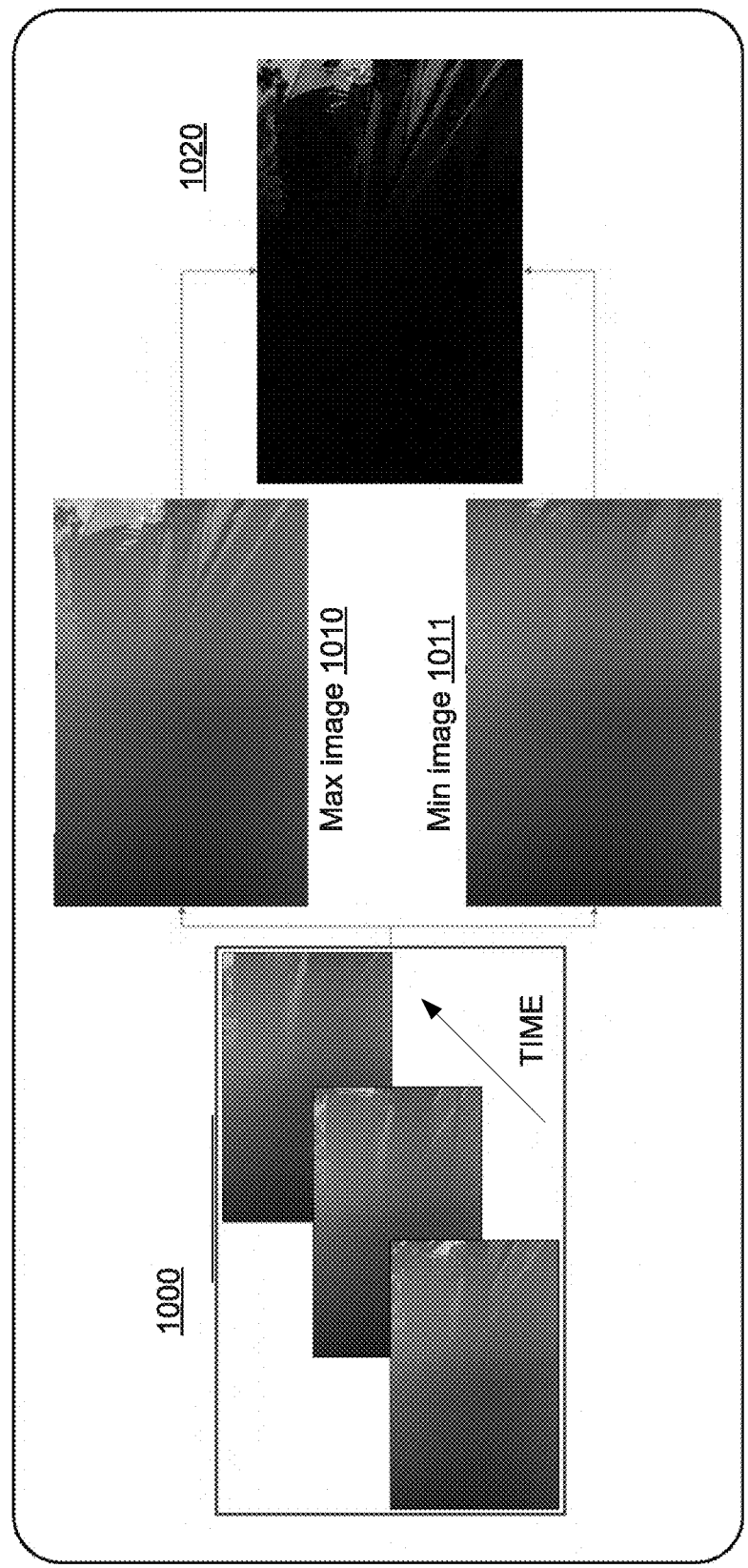
FIG. 10 shows a block diagram of illustrative images exhibiting blockage and extracted features, in accordance with some embodiments of the present disclosure.

FIG. 10 shows a block diagram of illustrative images exhibiting blockage and extracted features, in accordance with some embodiments of the present disclosure. Images 1000 are captured subsequent in time from a camera exhibiting a blockage corresponding roughly to the left half. In some embodiments, the system may determine an extracted image that is generated by determining a feature value for each region, or pixel, and assigning a visual indication of the value. For example, maximum image 1010 and minimum image 1011 may be determined by determining the minimum and maximum values for each region or pixel and then (i) reconstructing maximum image 1010 by combining the maximum values and (ii) reconstructing minimum image 1011 by combining the minimum values. To illustrate, maximum image 1010 and minimum image 1011 are themselves not respective images of images 1000 but rather are constructed from pixels of images 1000 based on min/max sorting for each region or pixel. The system may determine difference image 1020 by subtracting maximum image 1010 and minimum image 1011 region-wise or pixel-wise. Similarly, difference image 1020 is not itself an image of images 1000 but rather is constructed from combining the differences in maximum and minimum values (e.g., maximum image 1010 and minimum image 1011) at each region or pixel. For example, the left side of 1020 is shown as being almost completely black, which represents small differences in the corresponding regions, whereas the right side of 1020 shows variation in grayscale, which represents larger differences and variation in the differences in the corresponding regions. When there is blockage, differences across images are expected to be small in the blocked regions because variations in incident light on the camera is lessened, whereas when there is no blockage the images are expected to vary over time and thus the differences are expected to larger. Further, the system may require some vehicle movement, or change in captured images to distinguish clocked regions from static scenes (e.g., if the vehicle and lighting are not static, blockage may be more readily identified).

Figure 11:
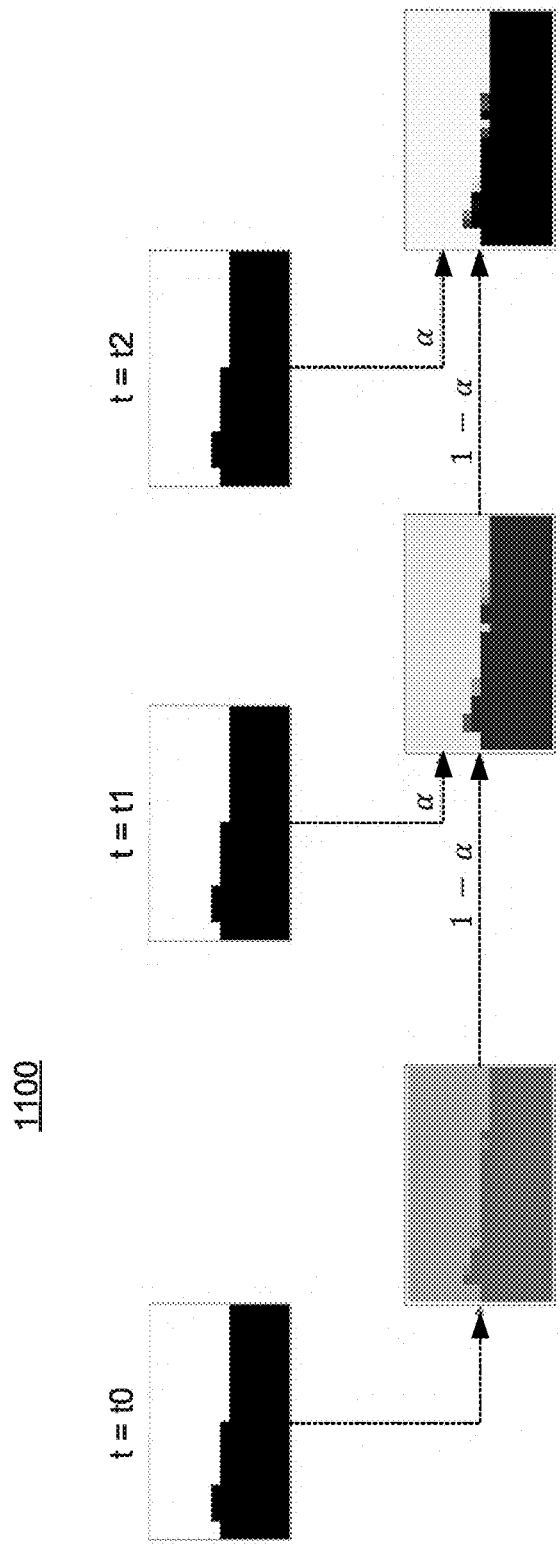
FIG. 11 shows a block diagram of an illustrative smoothing technique, in accordance with some embodiments of the present disclosure.

FIG. 11 shows a block diagram of an illustrative smoothing technique, in accordance with some embodiments of the present disclosure. As illustrated in FIG. 11, the parameter alpha is used to affect the "momentum" of the current state and thus affect the transition to another state, as described similarly in the context of FIG. 9. A sequence of block masks are illustrated, updated at each time step t0, t1, t2, etc. using the parameter alpha. The top row corresponds to classifier output (e.g., the instantaneous blockage mask), and the bottom row corresponds to smoothed classifier output (e.g., the predicted blockage mask). The blockage mask is updated at each time step, with the smoothed classification varying as confidence in the state change increases. The reinforcement of the classifier output occurs over time, in a non-linear manner for example, to increase the confidence and reduce false positives. For example, as illustrated, as time progresses (e.g., t0 to t1 to t2), regions for which the subsequent classification is the same as the previous classification are more likely to change classification. Further, as illustrated, regions near the boundary between blocked and unblocked (e.g., the boundary of the blockage mask) exhibit relatively more change in value, as the classifier values are less consistent, changing in time, or both.

Figure 12:
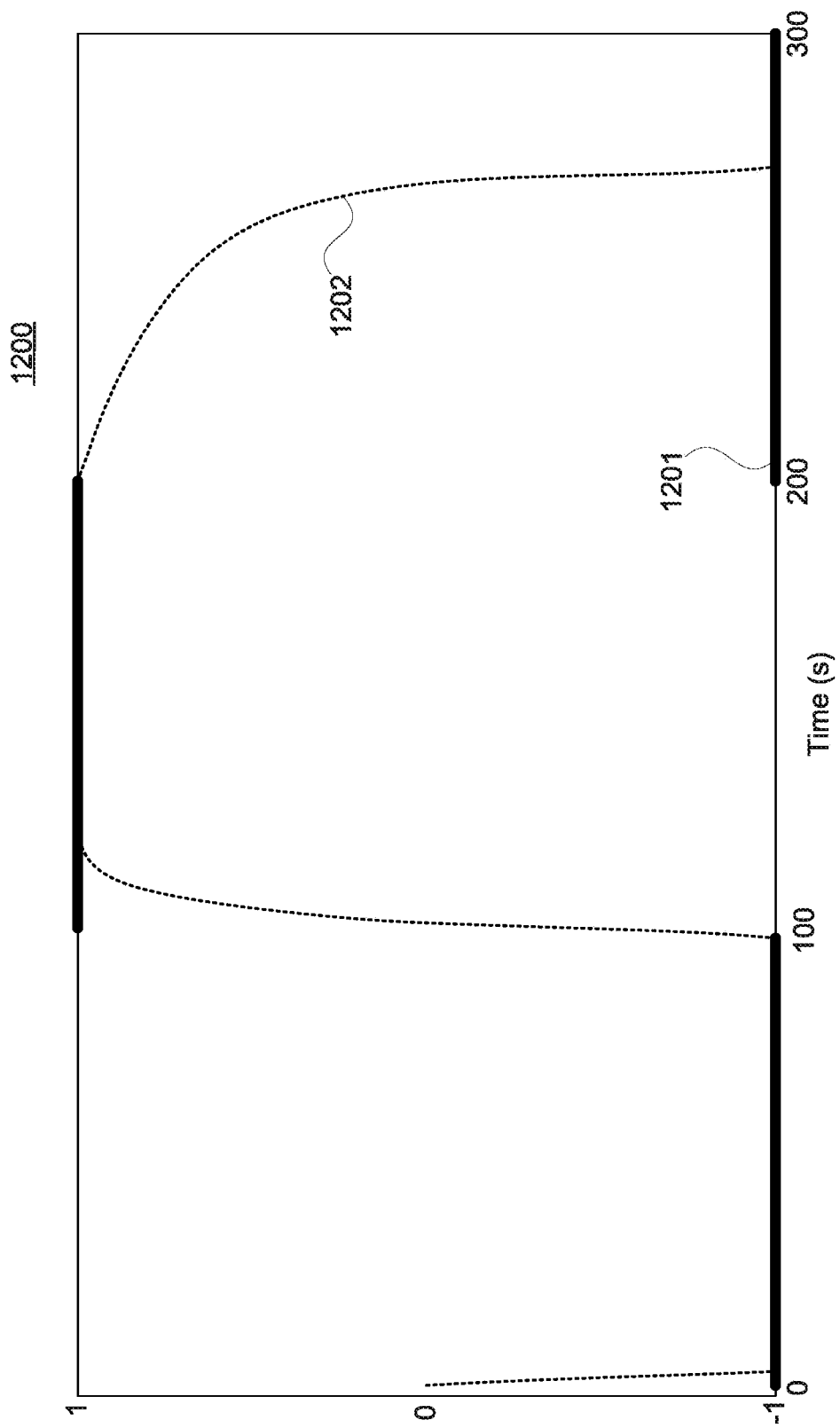
FIG. 12 shows a plot of illustrative responses for a smoothed classifier, in accordance with some embodiments of the present disclosure.

FIG. 12 shows a plot of illustrative responses for a smoothed classifier, in accordance with some embodiments of the present disclosure. Trace 1201 represents classifier output (e.g., from step 506 of process 500). Trace 1202 illustrates a smoothed classification generated using process 500 (e.g., using parameters as described in the context of FIGS. 13-14). When the classifier (e.g., classifier 320 of FIG. 3) changes its state between −1 (e.g., "blocked") to 1 (e.g., "unblocked" or "normal"), due to the Bayesian smoothing, the smoothed classifier (e.g., smoothing engine 330 of FIG. 3) does not change the decision immediately. The smoothed classifier causes the state transition to delay for some time to build confidence on the true state of the region (e.g., the one or more pixels corresponding to the region). As illustrated in FIG. 12, the smoothing classifier applies an uneven bias in the Bayesian smoothing technique. For example, transitioning from state −1 to state 1, it takes many fewer samples (e.g., frames, or time) as compared to transitioning from state 1 to state −1. As shown in the illustrative example of FIG. 12, the −1 to 1 transition takes about 30 seconds, while the 1 to −1 transition takes about 70 seconds. This is because the classifier may be configured to account for pixels most probably being unblocked (e.g., state 1 as illustrated). For example, if the classifier predicts the "unblocked" label, is may be desirable to quickly gain confidence, whereas if a region is classified as blocked, is may be desirable to wait longer before declaring that that the region is blocked (e.g., transitioning to the "blocked" state). In some embodiments, the difference in time to transition may be achieved by use of varying alpha and/or beta values (e.g., wherein the parameters are determined based on the current state).

Figure 13:
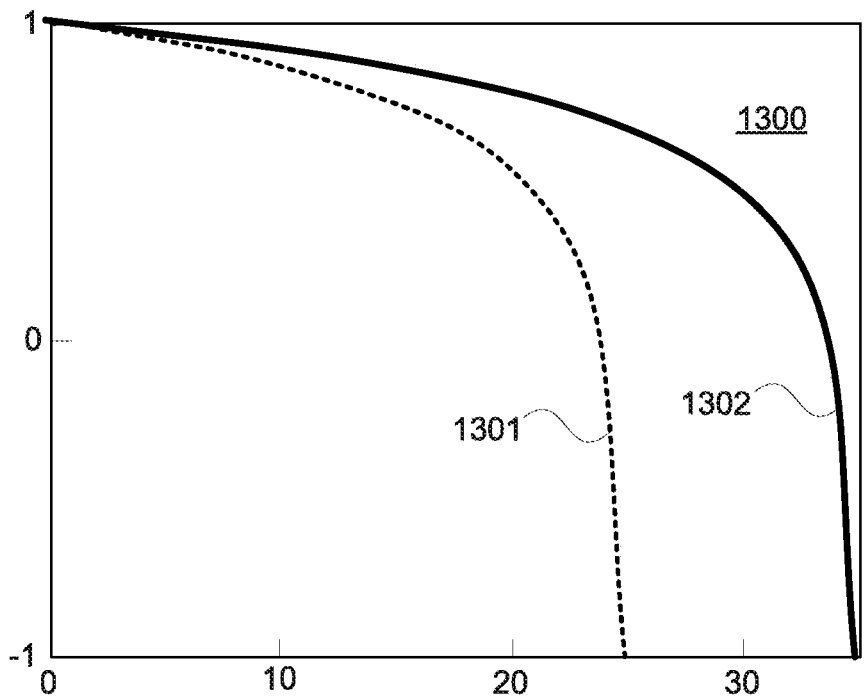
FIG. 13 shows a plot of illustrative responses for a smoothed classifier, in accordance with some embodiments of the present disclosure.
Figure 14:
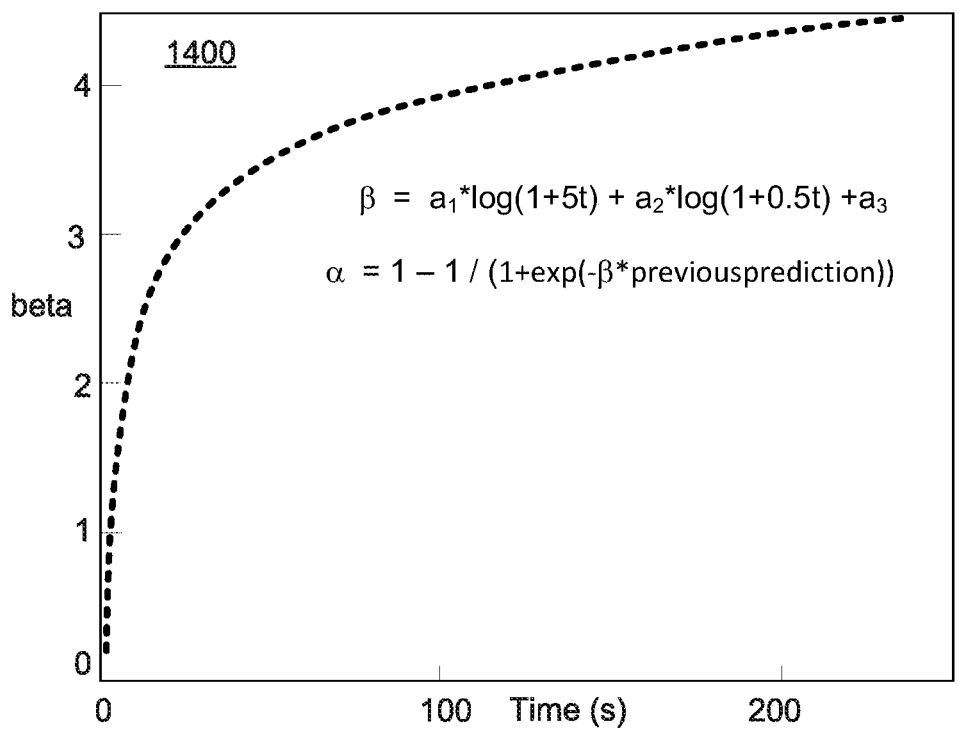
FIG. 14 shows a plot of an illustrative relationship between time and a smoothing metric, in accordance with some embodiments of the present disclosure.

FIG. 13 shows plot 1300 of illustrative responses for a smoothed classifier, in accordance with some embodiments of the present disclosure. FIG. 14 shows plot 1400 of an illustrative relationship between time and a smoothing metric, in accordance with some embodiments of the present disclosure. In some embodiments, process 500 of FIG. 5 may include the smoothing metric of FIG. 14, and may be used to generate data of plot 1300 (e.g., wherein the abscissa corresponds to time, and the ordinate corresponds to classification). Traces 1301 and 1302 illustrate smoothed classifications generated using process 500 (e.g., with differing smoothing metrics). When the classifier (e.g., classifier 320 of FIG. 3) changes its state from −1 (e.g., "blocked") to 1 (e.g., "unblocked" or "normal"), due to the Bayesian smoothing, the smoothed classifier (e.g., smoothing engine 330 of FIG. 3) does not change the decision immediately. The smoothed classifier causes the state transition to delay for some time to build confidence on the true state of the region (e.g., the one or more pixels corresponding to the region). As illustrated, trace 1301 exhibit a transition of about 25 seconds, while trace 1302 exhibit a transition of about 35 seconds, because each correspond to different values of beta and alpha, as included in FIG. 14. Expressions for determining alpha and beta are illustrated in FIG. 14, wherein the "previous prediction" corresponds to the previous classification value (e.g., dependent on the current state).

Figure 15:
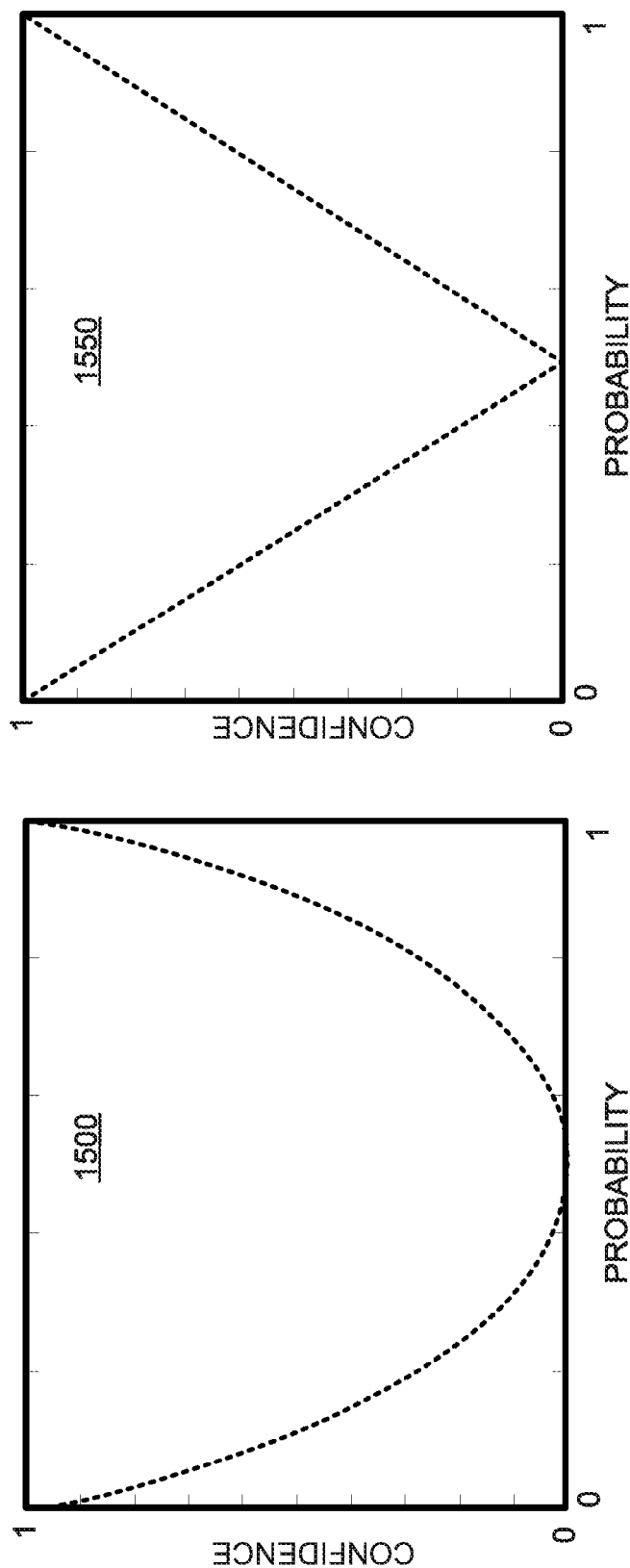
FIG. 15 shows plots of two illustrative confidence metrics, in accordance with some embodiments of the present disclosure.

FIG. 15 shows plots of two illustrative confidence metrics, in accordance with some embodiments of the present disclosure. Plot 1500 illustrates a nonlinear, entropy-based confidence metric, while plot 1550 illustrates a piecewise, linear confidence metric. In some embodiments, the smoothed classifier value for each region may be used to determine a probability (e.g., the probability may be equal to the smoothed classifier value). In some embodiments, the probability value may be used to determine a confidence value. For example, the curves of plot 1500, plot 1550, any other suitable confidence metric relationship, or any combination thereof may be used to determine a confidence value. For example, as illustrated, as the probability decreases below 0.5 or increases above 0.5, the confidence value increases (e.g., in opposite polarity of states). For example, a higher probability above 0.50 tends towards more confidence in one state, and a lower probability below 0.50 tends towards more confidence in another state.

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method for determining blockage of a camera, the method comprising:
    applying a partition grid comprising a plurality of locations to each image of a sequence of images to form a plurality of regions of each image, wherein each image of the sequence of images is indexed in time;
    determining at least one spatial feature corresponding to the partition grid and at least one temporal feature corresponding to the partition grid, wherein:
        one or more of the at least one spatial feature or the at least one temporal feature corresponds to a pixel feature characterized by a value that is compared to a dynamic range of values, and
        the dynamic range of values is modified based on a computed variation in pixel values in a region of adjacent locations of the partition grid;
    generating a sequence of binary classifications for each location of the plurality of locations based on the at least one spatial feature and on the at least one temporal feature;
    applying a smoothing technique to the sequence of binary classifications to determine a subset of regions that are blocked; and
    generating an output signal based on the subset of regions.

2. The method of claim 1, wherein the at least one spatial feature comprises a scale feature, and wherein determining the scale feature comprises:
    at each location of each image, determining a sequence of scale sizes;
    determining a range metric at each location for each scale size of the sequence of scale sizes to generate a set of range metrics; and
    determining a difference among the set of range metrics.

3. The method of claim 1, wherein the at least one temporal feature comprises a mean feature, and wherein the determining the mean feature comprises:
    determining, for each image, a respective mean metric at each location corresponding to more than one region to generate a sequence of mean metrics; and
    determining a difference among the sequence of mean metrics.

4. The method of claim 1, wherein the at least one temporal feature comprises a difference feature, and wherein the determining the difference feature comprises:
    determining a mean value for each region of a first image to generate a first set of mean values;
    determining a mean value for each region of a second image to generate a second set of mean values, wherein the second image is temporally adjacent to the first image; and
    determining a difference between each mean value of the first set of mean values with a corresponding mean value of the second set of mean values.

5. The method of claim 1, wherein the at least one temporal feature comprises a range feature, and wherein the determining the range feature comprises:
    determining a mean value for each region of each image of the sequence of images to generate a sequence of mean values for each location of the partition grid; and
    determining a difference between a maximum value and a minimum value of the sequence of mean values for each location of the partition grid.

6. The method of claim 1, wherein the at least one temporal feature comprises a gradient feature, and wherein the determining the gradient feature comprises:
    determining a gradient value for each region of each image of the sequence of images to generate a sequence of gradient values for each location of the partition grid; and
    determining, for each respective sequence of gradient values, a difference among gradient values of the respective sequence of gradient values.

7. The method of claim 1, wherein determining the at least one spatial feature and the at least one temporal feature comprises determining:
    a range feature;
    a gradient feature;
    a difference feature;
    a scale feature; and
    a mean feature.

8. The method of claim 1, wherein generating the sequence of binary classifications is further based on reference information comprising a reference value, and wherein generating the output signal comprises:
    determining a blockage extent;
    determining if the blockage extent exceeds the reference value; and
    identifying a response if the blockage exceeds the reference value, wherein the output signal is indicative of the response.

9. The method of claim 1, wherein the output signal is configured to cause an image processing module to disregard output of the camera.

10. The method of claim 1, wherein generating the output signal comprises generating a notification on a display device indicative of a blockage extent.

11. The method of claim 1, wherein the output signal is used to modify image processing to respond to the subset of regions that is blocked.

12. The method of claim 1, wherein applying the smoothing technique to the sequence of binary classifications to determine the subset of regions comprises:
    determining a smoothing metric based on a current binary classification of each location of the plurality of locations;
    determining a sequence of smoothed binary classification values based on the smoothing metric and the sequence of binary classifications; and
    determining a new binary classification based on the sequence of smoothed binary classification values.

13. A system for determining blockage of a camera, the system comprising:
    a camera system for capturing a sequence of images;

control circuitry coupled to the camera system, wherein the control circuitry is configured to:
- apply a partition grid comprising a plurality of locations to each image of the sequence of images to form a plurality of regions of each image, wherein each image of the sequence of images is indexed in time,
- determine at least one spatial feature corresponding to the partition grid and at least one temporal feature corresponding to the partition grid, wherein:
  - one or more of the at least one spatial feature or the at least one temporal feature corresponds to a pixel feature characterized by a value that is compared to a dynamic range of values, and
  - the dynamic range of values is modified based on a computed variation in pixel values in a region of adjacent locations of the partition grid;
- generate a sequence of binary classifications for each location of the plurality of locations based on the at least one spatial feature, the at least one temporal feature, and reference information, and
- apply a smoothing technique to the sequence of binary classifications to determine a subset of regions that are blocked; and an output interface configured to generate an output signal based on the subset of regions.

14. The system of claim 13, wherein the at least one spatial feature comprises a scale feature, and wherein the control circuitry is configured to determine the scale feature by:
- at each location of each image, determining a sequence of scale sizes;
- determining a range metric at each location for each scale size of the sequence of scale sizes to generate a set of range metrics; and
- determining a difference among the set of range metrics.

15. The system of claim 13, wherein the at least one temporal feature comprises a mean feature, and wherein the control circuitry is configured to determine the mean feature by:
- determining, for each image, a respective mean metric at each location corresponding to more than one region to generate a sequence of mean metrics; and
- determining a difference among the sequence of mean metrics.

16. The system of claim 13, wherein the at least one temporal feature comprises a difference feature, and wherein the control circuitry is configured to determine the difference feature by:
- determining a mean value for each region of a first image to generate a first set of mean values;
- determining a mean value for each region of a second image to generate a second set of mean values, wherein the second image is temporally adjacent to the first image; and
- determining a difference between each mean value of the first set of mean values with a corresponding mean value of the second set of mean values.

17. The system of claim 13, wherein the at least one temporal feature comprises a range feature, and wherein the control circuitry is configured to determine the range feature by:
- determining a mean value for each region of each image of the sequence of images to generate a sequence of mean values for each location of the partition grid; and
- determining a difference between a maximum value and a minimum value of the sequence of mean values for each location of the partition grid.

18. The system of claim 13, wherein the at least one temporal feature comprises a gradient feature, and wherein the control circuitry is configured to determine the gradient feature by:
- determining a gradient value for each region of each image of the sequence of images to generate a sequence of gradient values for each location of the partition grid; and
- determining, for each respective sequence of gradient values, a difference among gradient values of the respective sequence of gradient values.

19. The system of claim 13, wherein the control circuitry is configured to determine the at least one spatial feature and the at least one temporal feature by determining:
- a range feature;
- a gradient feature;
- a difference feature;
- a scale feature; and
- a mean feature.

20. The system of claim 13, wherein the control circuitry is further configured to generate the sequence of binary classifications based on reference information comprising a reference value, and wherein the output interface is configured to generating the output signal by:
- determining a blockage extent;
- determining if the blockage extent exceeds the reference value; and
- identifying a response if the blockage exceeds the reference value, wherein the output signal is indicative of the response.

* * * * *